July 5, 1932. W. PEYINGHAUS 1,865,951
OIL CHECK RING FOR JOURNAL BOXES
Filed March 29, 1929
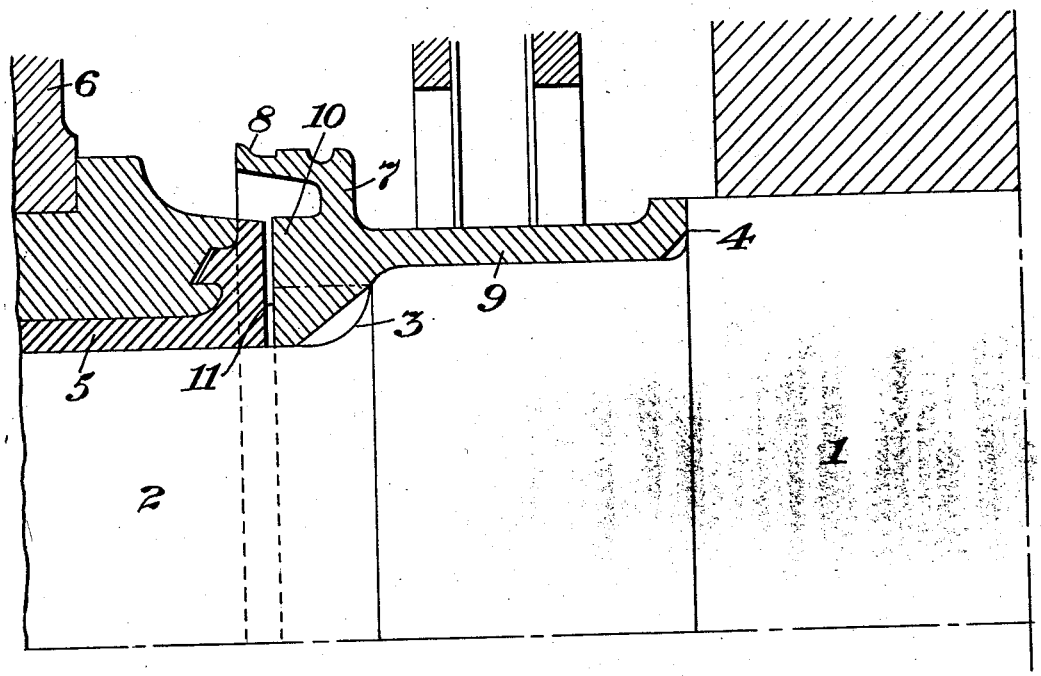
INVENTOR
BY
HIS ATTORNEY Patented July 5, 1932

1,865,951

UNITED STATES PATENT OFFICE

WALTER PEYINGHAUS, OF EGGE, GERMANY, ASSIGNOR TO ISOTHERMOS CORPORATION OF AMERICA, OF NEW YORK, N. Y., A CORPORATION OF DELAWARE

OIL CHECK RING FOR JOURNAL BOXES

Application filed March 29, 1929, Serial No. 350,951, and in Germany May 15, 1928.

The invention relates to certain improvements in oil check rings for self-lubricating journal boxes, such as usually employed on railway cars and the like, and has for its object to provide a check ring with an abutment to take up the thrust of the journal bearing. The invention is illustrated in the accompanying drawing, in which:—

The figure is a fragmentary sectional elevation of a car axle provided with an oil check ring or disk, and a small section of the journal box.

It is customary to fashion the sections of car axles between the journals and the shanks or bodies of the axles with fillets, which, in addition to strengthening the axle structure, constitute lateral thrust surfaces for the bearings carried by the journal boxes. It has been found, however, that the ends of the bearing seldom have a proper bearing engagement with the fillets, but usually engage the same along a relatively narrow arcuate surface, with the result that heavy vertical stresses are imposed upon the ends of the bearings causing the latter to crystallize and eventually crumble and disintegrate. An object of the present invention is to obviate this defect and to provide a lateral thrust receiving abutment for the journal bearing, which will engage substantially the entire superficial area of the end of the bearing and constitute what is, in effect, an end thrust bearing for the axle and relieve the journal bearing of the vertical stresses applied thereto by the engagement of the fillet under the old practice.

Referring to the drawing, 1 indicates the shank or body of the axle, which is provided with the usual journal section 2 connected to the body by a fillet 3, the primary object of which is to prevent weakening the axle by a right-angle shoulder and the secondary purpose of which is to serve as an end thrust bearing for the axle as the latter moves axially with respect to its bearing. In the exemplary form of the axle shown, there is provided a second shoulder 4 spaced a short distance inwardly of the filleted shoulder 3.

The journal section engages the usual removable bearing 5 mounted in the axle box 6. It has been customary to secure to the axle adjacent the bearing carried by the journal box, an obturating disk or check ring to prevent the oil creeping along the axle, escaping from the box and being lost, which ring also serves to distribute any oil collected thereby to the bearing or to return the same to the reservoir in the bottom of the axle box. A modified check ring of this character is illustrated in the drawing, in which 7 is the body of the ring, 8 the peripheral flange extending toward the bearing 5, and 9 an elongated sleeve extending in the opposite direction and having an end abutting against the shoulder 4 on the body of the axle. Formed centrally within the cup-shaped ring is a central hub 10 having a plain face 11 substantially parallel with the end face of the bearing and which serves as an abutment to distribute the end thrust of the axle, when the latter moves axially within the bearing, so that no vertical or radial stresses will be imposed upon the end of the bearing. It will be understood that the check ring is fixed to the axle and rotates therewith and that the plain face 11 of the hub in engagement with the end of the bearing provides a relatively large area of surface contact which results in a low unit pressure between these parts, thereby greatly reducing the wear and completely obviating the dangerous vertical or radial stresses commonly imposed by the fillet section of the axle on the end of the bearing.

What I claim is:

1. In combination, an axle inclusive of a journal portion of reduced diameter merging with the axle proper through a rounded fillet, a bearing for said journal portion, and a thrust ring mounted on the axle proper and including a portion of less diameter than the axle proper surrounding the journal portion of the axle for contact at its end with the end of the bearing to maintain the rounded fillet spaced from the bearing.

2. In combination, an axle inclusive of a main portion, a journal portion of less diameter than the main portion and an intermediate portion of greater diameter than the journal portion and of less diameter than the main portion, the journal portion merging with the intermediate portion through a rounded fillet and there being a shoulder at the junction of the main and the intermediate portions, a bearing for the journal portion, and a thrust ring sleeved over the intermediate portion of the axle against said shoulder and of greater length than the intermediate portion so as to overlie a part of the journal portion for contact at its end with the end of the bearing to maintain the rounded fillet spaced from the bearing.

3. The combination as set forth in claim 1 in which the thrust ring is provided with an annular flange overlying the end of the bearing.

4. The combination as set forth in claim 2 in which the portion of the thrust ring which overlies the journal portion of the axle is of less diameter than the intermediate portion of the axle.

5. The combination as set forth in claim 2 in which the thrust ring is provided with an annular flange spaced outwardly from and overlying the end of the bearing.

In testimony whereof I affix my signature.

WALTER PEYINGHAUS.